United States Patent [19]

Miyata

[11] Patent Number: 4,575,116
[45] Date of Patent: Mar. 11, 1986

[54] SHOCK ABSORBER CONTROL UNIT FOR USE OF A VEHICLE SUSPENSION

[75] Inventor: Hiroshi Miyata, Toyota, Japan

[73] Assignee: Toyota Jidosha Kabushiki Kaisha, Aichi, Japan

[21] Appl. No.: 563,175

[22] Filed: Dec. 19, 1983

[30] Foreign Application Priority Data

Dec. 27, 1982 [JP] Japan .................. 57-234584

[51] Int. Cl.⁴ .................................................. B60G 17/08
[52] U.S. Cl. ..................................... 280/707; 280/772
[58] Field of Search ............... 280/707, 772; 180/143, 180/142

[56] References Cited

U.S. PATENT DOCUMENTS

| | | | |
|---|---|---|---|
| 3,321,210 | 5/1967 | Delchev | 280/707 |
| 3,608,925 | 9/1971 | Murphy | 280/707 |
| 3,866,706 | 2/1975 | Lincke | 180/142 |
| 4,345,661 | 8/1982 | Nishikawa | 280/772 |
| 4,386,674 | 6/1983 | Sugata | 120/142 |
| 4,441,572 | 4/1984 | Ito | 180/143 |
| 4,457,390 | 7/1984 | Abe | 180/142 |
| 4,476,529 | 10/1984 | Nakamura | 180/142 |

FOREIGN PATENT DOCUMENTS

| | | | |
|---|---|---|---|
| 147107 | 4/1955 | Japan | 280/707 |
| 182505 | 11/1982 | Japan | 280/772 |

OTHER PUBLICATIONS

Patent Abstracts of Japan, vol. 5, No. 97, Jun. 24, 1981, and JP A-56-42739.
Patent Abstracts of Japan, vol. 7, No. 55, Mar. 5, 1983 and JP-A-57-201707, (Dec. 10, 1982).

*Primary Examiner*—Joseph F. Peters, Jr.
*Assistant Examiner*—Everett G. Diederiks, Jr.
*Attorney, Agent, or Firm*—Parkhurst & Oliff

[57] ABSTRACT

A shock absorber control unit for differentiating a damping force of a shock absorber mounted in a vehicle. The control unit is designed to increase the damping force of the shock absorber on the condition that a operator rotates a steering wheel from a neutral position to a steered position, and to maintain the normal damping force of the shock absorber on the condition that the driver steers the steering wheel from the steered position to the neutral position.

8 Claims, 9 Drawing Figures

SHOCK ABSORBER CONTROL UNIT FOR USE OF A VEHICLE SUSPENSION

BACKGROUND OF THE INVENTION

The present invention relates to a shock absorber control unit for use in a vehicle suspension, and more particularly to a unit for controlling a vehicle roll velocity which occurs when an operator drives a vehicle on a curved road.

Figure 1:
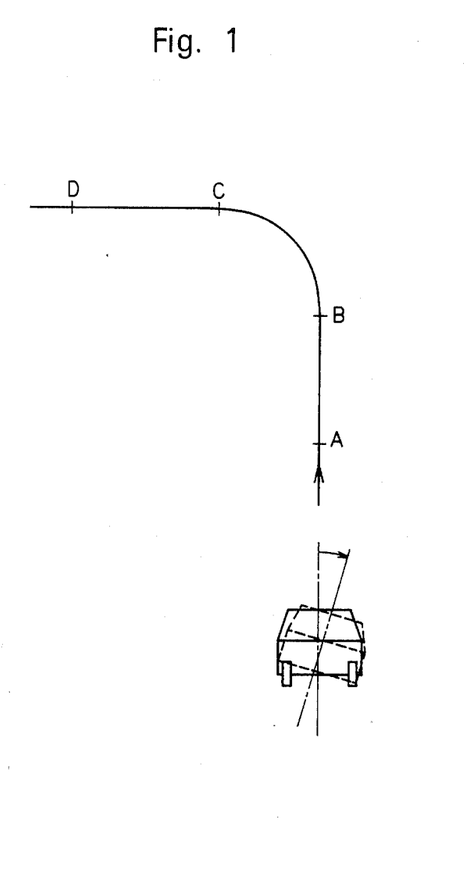
FIG. 1 is a schematic view showing a curved road and a rolled vehicle.
Figure 2A:
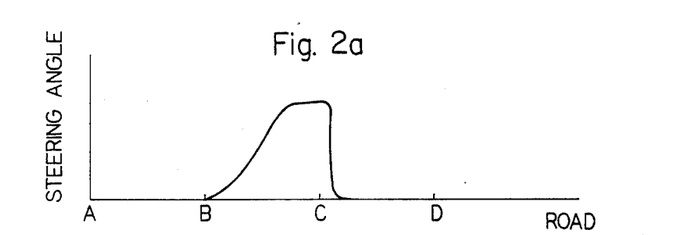
FIGS. 2(a), (b) and (c) are graphs illustrating a steering angle, a steering angular velocity, and a vehicle's roll, respectively, when a vehicle runs on the curved road shown in FIG. 1.
Figure 2B:
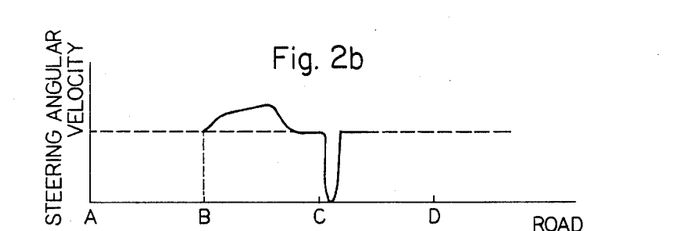

In general, when an operator drives on a curved road as shown in FIG. 1 at a constant speed, the operator gradually rotates a steering wheel in the counterclockwise direction from a point B. FIG. 2(a) shows a rotated angle of a steering shaft when the vehicle runs through the points of the curved road as shown in FIG. 1. From this FIG. 2(a), it is apparent that the steering angle gradually varies from the point B. An operator will hesitate to rotate a steering wheel quickly in a direction because this will increase a vehicle's roll. When the operator drives through the curved road by the adequate steering operation, and reaches a point C, the operator rotates the steering wheel in the clockwise direction in order to straighten the vehicle. The operator can quickly rotate the steering wheel (e.g. the operator can rotate the steering wheel at a high steering angular velocity) at the point just past the point C to straighten the car as shown in FIG. 2(b).

Figure 2C:
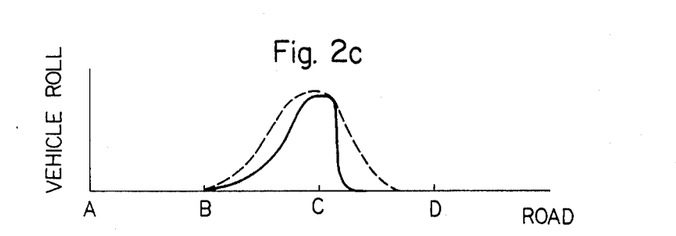

Heretofore, a shock absorber control unit has been proposed such that it increases the damping force of the shock absorber when the steering angular velocity exceeds a predetermined value decided by the vehicle speed, and thereby decreases the vehicle roll. The proposed prior art shock absorber control unit is designed to increase the damping force of the shock absorber even when the operator returns the steering wheel from the turning position to the neutral position. FIG. 2(c) shows a degree of a vehicle roll, and the broken line in FIG. 2(c) indicates the degree of a vehicle's roll according to the proposed prior art. As apparent from the FIG. 2(c), the degree of the vehicle roll from the point C to the point D according to the prior art is almost same as that of the roll from the point B to the point C. This means that the vehicle receives a high roll even when the operator rotates the steering wheel in the direction from the turning position to the neutral position thereof. This performance results in the delay of the vehicle being returned to the normal attitude.

SUMMARY OF THE INVENTION

The present invention was made in view of the foregoing background and to overcome the foregoing drawbacks.

It is an object of this invention to provide a shock absorber control unit for use in a vehicle suspension which increases a damping force of a shock absorber when the steering wheel is rotated in the direction from a neutral position to a turning position, and does not increase the damping force of the shock absorber when the steering wheel is rotated from the turning position to the neutral position.

To attain the above object, a shock absorber control unit for use in a vehicle suspension according to the present invention has a vehicle speed sensor and a steering angle snesor. The output signal of the vehicle speed sensor is inputted to a vehhicle speed signal generating means. Similarly, the output signal of the steering angle sensor is inputted to a steering angular velocity signal generating means. These signals of the vehicle speed and the steering angular velocity are compared with reference values of a reference value setting means by a comparator. The reference value setting means sets a first reference value when the steering wheel is turned in the direction from its neutral position to a turning position, and sets a second reference value to be larger than that of the first reference value when the steering wheel is turned in the direction from the turning position to the neutral position. The comparator compares one of the reference values with the steering angular velocity signal and generates a first output signal when the angular velocity signal is larger than the reference values, and a second output signal when the steering angular velocity signal is smaller than the reference values. As a result, when the first output signal is generated, an actuating means increases a damping force of the shock absorber. Conversely, when the second output signal is generated, the actuating means decreases a damping force of the shock absorbers. Thus, when a vehicle runs on a curved road, the damping force of the absorber increases to prevent the vehicle roll.

The above object, features and advantages of the present invention will become apparent from the following description of the preferred embodiment taken in conjunction with the accompanying drawings.

DETAILED DESCRIPTION OF THE PREFERRED EMBODIMENTS

Figure 3:
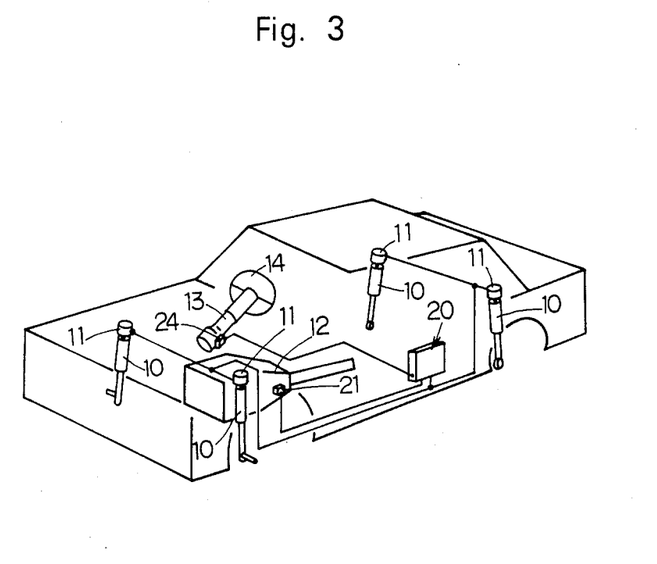
FIG. 3 is a schematic perspective view of a vehicle employing a shock absorber control unit according to the present invention.

FIG. 3 shows a schematic perspective view of a vehicle employing a shock absorber control unit according to the present invention. A vehicle, shown in FIG. 3, has front-wheel and rear-wheel suspensions, each of which includes a pair of shock absorbers 10, whose damping force is adjustable. Each of the absorbers 10 includes an electric actuator which operates a flow control means, such as a variable orifice, therein. The numeral 20 designates an electronic control unit according to the present invention.

Figure 4:
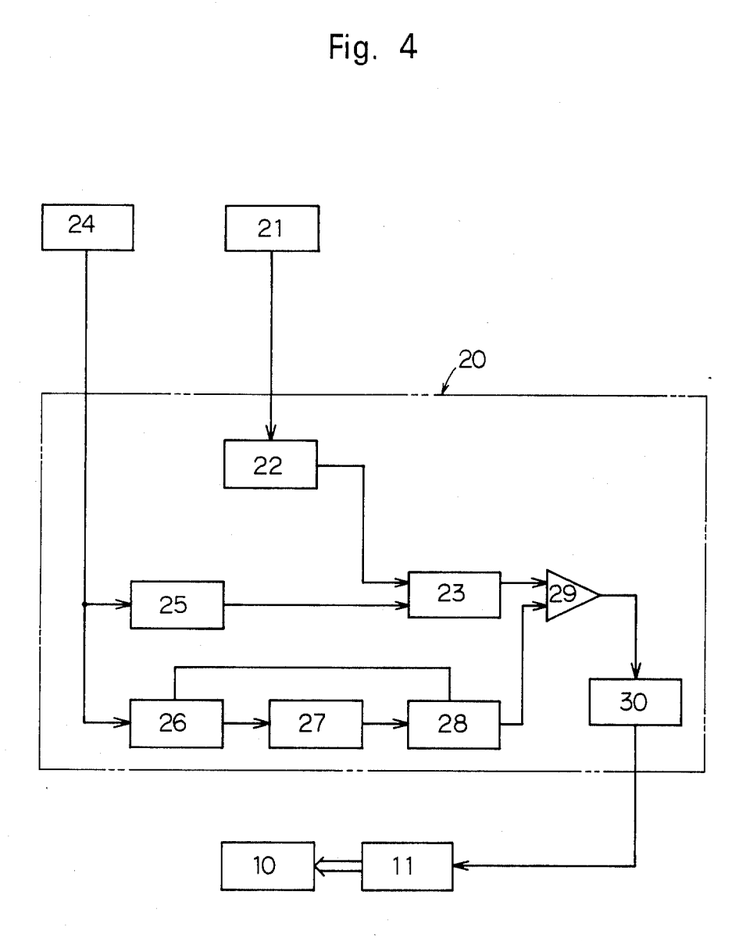
FIG. 4 is a block diagram of an electronic control unit shown in FIG. 3.

The electronic control unit 20, as shown in FIG. 4, has a vehicle speed signal generating circuit 22, a steering angular velocity signal generating circuit 25, and a steering angle signal generating circuit 26. The vehicle speed signal generating circuit 22 receives the signal of a vehicle speed sensor 21, and calculates the actual vehicle speed from the signal, thereafter the vehicle speed signal generating circuit issues a vehicle speed signal corresponding to the actual vehicle speed. The steering angular velocity signal generating circuit 25 receives the signal of a steering angle sensor 24, detects the period between the start and end of the rotation of the steering wheel, and calculates the actual steering angular velocity from the signal. The steering angular velocity signal generating circuit 25 then issues a steering angular velocity signal corresponding to the actual steering angular velocity.

The vehicle speed sensor 21, is mounted on a transmission 12, as shown in FIG. 3, and issues a signal corresponding to the number of the revolutions (RPM) of an output shaft of the transmission 12. The steering angle sensor 24 is mounted on an outer periphery of a steering column 13, and detects a steering angle corresponding to the steering angle of a steering shaft rotated by a steering wheel 14 and detects a rotational direction of the steering wheel.

As shown in FIG. 4, an arithmetic and logic circuit 23 for compensating or adjusting a steering angular velocity signal on the basis of the vehicle speed signal receives the signals of the circuits 22 and 25, and amends the steering angular velocity signal from the circuit 25 by selecting the larger value when the vehicle speed signal from the circuit 22 is the larger value. On the other hand, the arithmetic and logic circuit 23 amends the steering angular velocity signal from the circuit 25 by selecting the smaller values when the vehicle speed signal from the circuit 22 is the smaller value. These amended values by the circuit 23 are inputted to a comparator 29.

The steering angle signal generating circuit 26 receives the signal of the steering angle sensor 24, and calculates the actual steering angle to issue the steering angle signal corresponding to the actual steering angle.

The output signal of the steering angle generating circuit 26 is inputted to a circuit 27, which determines the direction of the rotation of the steering shaft. The circuit 27 detects whether the steering shaft is rotated in the direction from the neutral position to a turning position, or from the turning position to a further turning position, or from the turning position to the neutral position. The results detected by the circuit 27 are inputted to a reference value setting circuit 28. The reference value setting circuit 28 issues a reference value according to the output signals of the circuit 27. When the steering shaft is rotated in the direction from the neutral position to the turning position, the circuit 28 sets a first reference value, "1". Next, when the steering shaft is rotated from a turning position to a further turning position, the circuit 28 sets a second reference value, "0.4". Further, when the steering shaft is rotated from the turning position to the neutral position, the circuit 28 sets third reference value, "3". These reference values of the circuit 28 are inputted to the comparator 29. The comparator 29 compares the amended values of the circuit 23 with the reference values of the circuit 38 to thereby issue an output signal corresponding to the compared results. When the amended value of the circuit 23 is larger than the reference value of the circuit 28, the comparator 29 issues a first output signal. On the other hand, when the amended value of the circuit 23 is smaller than the reference value of the circuit 28, the comparator 29 issues a second output signal. The output signals of the comparator 29 are inputted to an actuating circuit 30. The actuating circuit 30 operates an actuator 11 to increase the damping force of each of the shock absorbers 10 when the actuating circuit 30 receives the first output signal from the comparator 29. Conversely, when the actuating circuit 30 receives the second output signal from the comparator 29, the actuating circuit 30 operates the actuator 11 to decrease the damping force of each of the shock absorbers 10.

When a vehicle equipped with the electronic control unit 20, runs on a curved road, as shown in FIG. 1 at a high speed, an operator rotates the steering wheel 14 in the counterclockwise direction at the point B, the vehicle tends to incline to the position illustrated in a broken line in FIG. 1. On this condition, the arithmetic and logic circuit 23 amends the steering angular velocity signal from the circuit 25 to the larger value because the vehicle speed signal from the circuit 22 is the larger value. Hence, the amended value of the circuit 23 exceeds the first reference value, "1" set by the circuit 28. Due to this, the comparator 29 issues the first output signal, and this first output signal is inputted to the actuating circuit 30. The actuating circuit 30 operates the actuator 11 so that it can increase the damping force of each of the shock absorbers 10. This is attained by the operation such that the oil flow within the shock absorbers 10 is restricted, thereby it delays the constrictive slide movement of the shock absorbers 10. The vehicle's roll is adjusted to be moderate from the point B to the point C, as shown in the solid line in FIG. 2(c).

When the operator further rotates the steering wheel in the counterclockwise direction from the steered position, the circuit 23 amends the steering angular velocity to the large value even if the steering angular velocity is small. The amended value of the circuit 23 exceeds the first reference value, "1" set by the reference value setting circuit 28. Due to this, the comparator 29 issues the first output signal, and this first output signal is inputted to the actuating circuit 30. The actuating circuit 30 actuates each of the actuators 11 mounted on the each of the shock absorbers 10, in order to increase the damping force of each of the shock absorbers 10. As a result, the oil flow of the chamber within each of the shock absorbers 10 is restricted, thereby decreasing the speed at which the shock absorber decreases in size or constricts. This creates a smaller vehicle roll as illustrated by the solid line in FIG. 2(c) than the vehicle roll in the prior art as illustrated by the broken line in FIG. 2(c).

When the operator turns the steering wheel in the counterclockwise direction from a turning position to a further turning position (e.g. a position in which the car is turning more sharply), the steering angular velocity is amended to the large value in the arithmetic and logic circuit 23 even if the steering angular velocity is small. When the amended value exceeds the second reference value, "0.4" set by the reference value setting circuit 28, the comparator 29 issues the first output signal. This first output signal is inputted to the actuating circuit 30. The actuating circuit 30 actuates each of the actuators 11, and further increases the damping force of the each of the shock absorbers 10. Hence, the shock absorbers 10 are forced to constrict at a much slower speed, thereby decreasing the vehicle's roll. This results in steady steering control of a vehicle. When the vehicle reaches to the point C indicated in FIG. 1 after being driven through the curved road, the operator rotates the steering wheel 14 from the turning position to the neutral position in order to straighten the vehicle. At this time, the reference value setting circuit 28 sets the third reference value, "3", which is larger than the first or second reference value. As the amended value of the arithmetic and logic circuit 23 is designed not to exceed the value of the third reference, the comparator 29 issues the second output signal. The second output signal of the comparator 29 is inputted to the actuating circuit 30. The actuating circuit 30 actuates each of the actuators 11 to decrease the damping force of each of the shock absorbers 10. As a result, the restriction of the oil flow within the shock absorbers is released, which enables the prompt stretch of the shock absorbers 10. The vehicle's roll is promptly decreased from the point C as illustrated in the solid line in FIG. 2(c), and the operator can easily drive the vehicle in a straight line.

Figure 5:
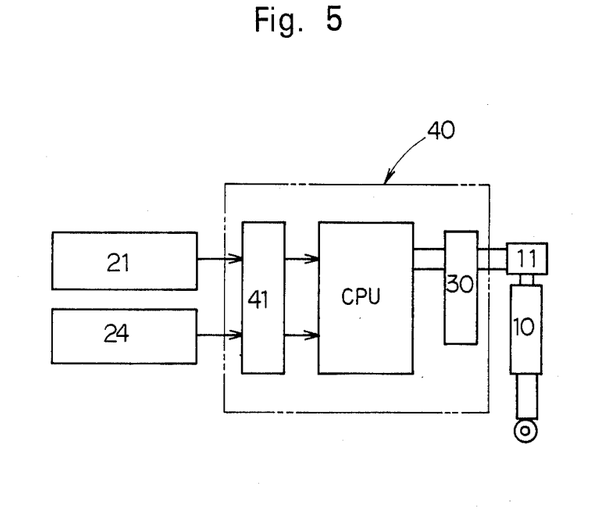
FIG. 5 is a block diagram of an electronic control unit employed in the another embodiment of the present invention.
Figure 6:
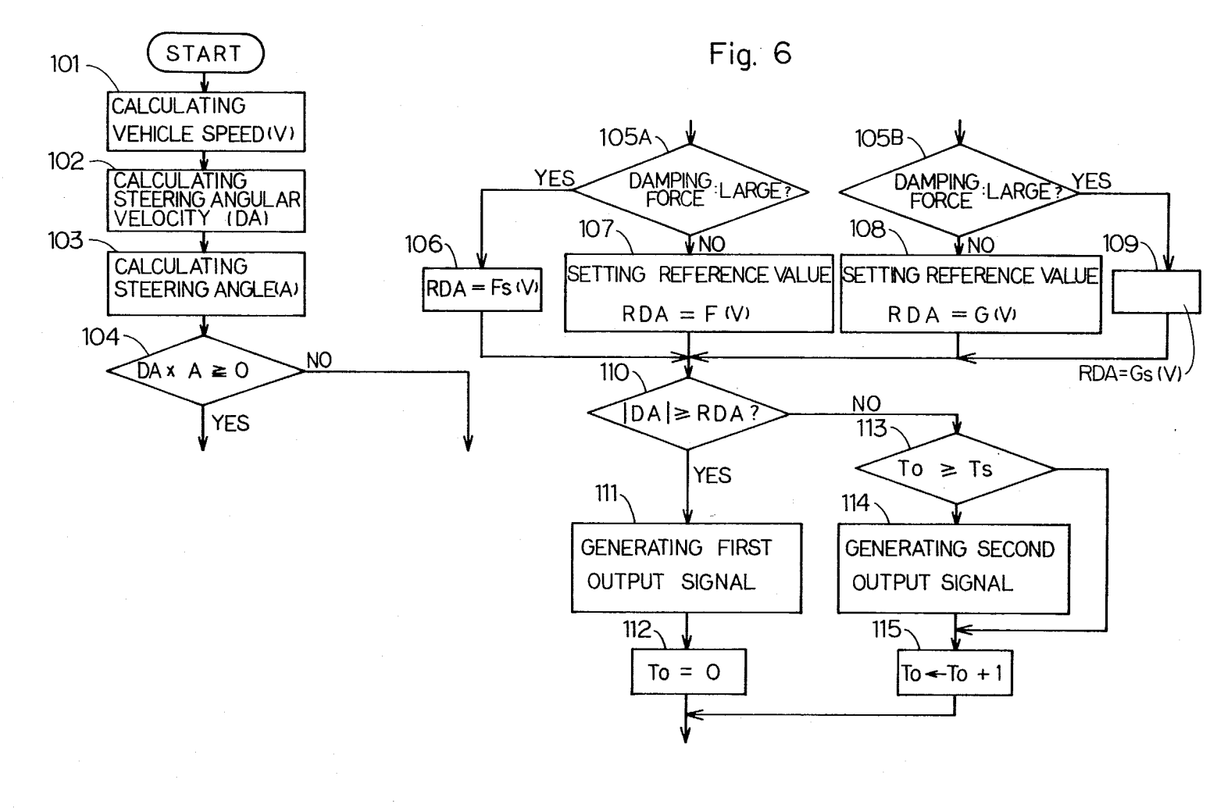
FIG. 6 is a flow chart of a program employed in the electronic control unit shown in FIG. 5.
Figure 7:
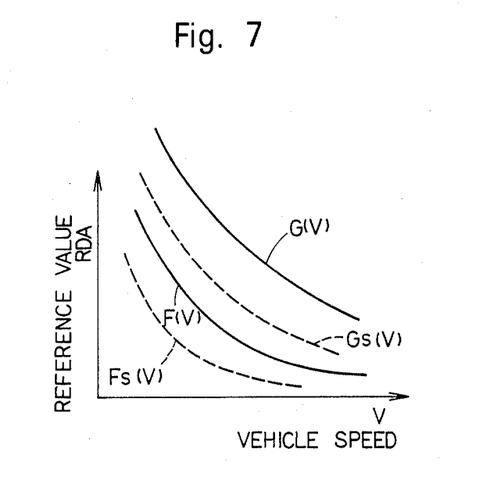
FIG. 7 is a graph showing a relation between a vehicle speed and a reference value.

FIGS. 5 through 7 show a second embodiment of the present invention. In this second embodiment, a digital type electronic control unit 40 is employed instead of the analog type electronic control unit 20 according to the first embodiment. The digital type electronic control unit 40 has a buffer 41 receiving the output signals of the vehicle speed sensor 21 and the steering angle sensor 24, a central processing unit (hereinafter referred to as CPU) for receiving the output signals of the buffer 41 and carrying out a flow chart illustrated in FIG. 6, and an actuating circuit 30 for operating actuators 11 according to the output signals of the CPU.

FIG. 6 illustrates the flow chart of the steps in the CPU. A step 101 calculates a vehicle speed (V) from the signal of the vehicle speed sensor 21. Next, a program proceeds to a step 102. The step 102 calculates a steering angular velocity, "DA", from the signal of the steering angle sensor 24. In the step 102, when the steering shaft is rotated in the clockwise direction from the neutral position, the step 102 is designed to issue a positive steering angular velocity, "DA". On the other hand, when the steering shaft is rotated in the counterclockwise direction from the neutral position, the step 102 is designed to issue a negative steering angular velocity, "DA". The program proceeds to a step 103. The step 103 calculates a steering angle, "A". The step 103 is designed to count that a steering angle is 0° at the neutral steering position, that a steering angle, "A" is positive at the steering shaft being clockwise rotated from the neutral steering position, and that a steering angle, "A", is negative at the steering shaft being counterclockwise rotated from the neutral steering position. The program proceeds to a step 104. The step 104 determines whether the multiplied value, "DA×A" is positive or not. When the multiplied value, "DA×A" is positive or equal to zero, the program proceeds to a step 105A. When the multiplied value, "DA×A" is negative, the program proceeds to a step 105B. In the step 105A, it is determined whether the damping force of the shock absorber 10 is large or not. When the damping force of the shock absorber 10 is large, the program proceeds to a step 106. The step 106 sets a reference value, "RDA" according to the actual vehicle speed, "V". The reference value, "RDA" is determined by a characteristic cruve Fs(V) illustrated in FIG. 7. When the step 105A determines that the damping force of the shock absorbers 10 is small, the program proceeds to a step 107. The step 107 sets a reference value, "RDA" according to the actual vehicle speed, "V". This reference value, "RDA", is determined by a characteristic curve F(V) illustrated in FIG. 7.

The step 105B determines whether the damping force of the shock absorber 10 is large or not. When the damping force of the shock absorber 10 is large, the program proceeds to a step 109. The step 109 sets a reference value, "RDA" according to the actual vehicle speed, "V". The reference value, "RDA", is determined by a characteristic curve "Gs(V)" illustrated in FIG. 7. When the damping force of the shock absorber 10 is small, the program proceeds to a step 108. The step 108 sets a reference value, "RDA" according to the actual vehicle speed, "V". The reference value, "RDA", is determined by a characteristic curve "G(V)" illustrated in FIG. 7. Thus, each reference value, "RDA", is selectively set by the steps 106 through 109. Next, the program proceeds to a step 110. The step 110 compares the actual steering angular velocity, "DA", with the reference value, "RDA". If the absolute value of the actual steering angular velocity, "|DA|", is larger than or equal to that of the reference value, "RDA", the program proceeds to a step 111. If the absolute value of the actual steering angular velocity, "|DA|", is smaller than that of the reference value, "RDA", the program proceeds to a step 113. In the step 111, the CPU issues the first output signal. This first output signal is inputted to the actuating circuit 30, thereby the circuit 30 operates the actuators 11 to increase the damping force of the shock absorbers 10. Thereafter, the program proceeds to a step 112. In the step 112, a timer "To" is set to be zero. The step 113 issues a signal to a step 114 when the timer "To" counts a predetermined time, "Ts". Next, the program proceeds to the step 114. In the step 114, the CPU issues a second output signal. This second output signal is inputted to the actuating circuit 30, thereby the circuit 30 operates the actuators 11 to decrease the damping force of each of the shock absorbers 10.

In operation, when a vehicle equipped with the electronic control unit 40 runs along the curved road as shown in FIG. 1 at a high speed, an operator rotates the steering wheel 14 in the counterclockwise direction at the point B. At this time, the vehicle rolls to the position as shown in the broken line in FIG. 1. The step 104 of the program determines that the multiplied results, "DA×A", is larger than the value, zero. Due to this, the program proceeds to the step 105A. If the damping force of the shock absorber 10 is determined to be small in the step 105A, the program proceeds to the step 107. The step 107 sets the reference value, "RDA", to be equal to the value decided by the characteristic curve "F(V)" in FIG. 7. As the absolute value of the actual steering angular velocity, "|DA|", becomes larger than that of the reference value, "RDA", the program proceeds to the step 111. In the step 111, the CPU issues the first output signal. This first output signal is inputted to the actuating circuit 30. The actuating circuit 30 operates each of the actuators 11 so as to increase the damping force of the shock absorbers 10. Hence, the oil flow within the shock absorbers 10 is restricted, thereby it decreases the speed with which the shock absorbers are decreased in size. As a result, the vehicle roll speed is forced to be small as illustrated in the solid line of FIG. 2(c).

When the operator further rotates the steering wheel in the counterclockwise direction during driving on the curved road, the step 104 decides that the multiplied value, "DA×A" becomes larger than the value, zero. The program proceeds to the step 105A. If the damping force of the shock absorbers 10 is large, the program proceeds to the step 106. The step 106 sets the reference value, "RDA" to be equal to the value determined by the characteristic curve "Fs(V)" in FIG. 7. As the absolute value of the actual steering angular velocity, "|DA|", becomes larger than that of the reference value, "RDA", the CPU issues the first output signal in the step 111. Hence, the actuating circuit 30 operates each of the actuators 11 in order to further increase the damping force of the shock absorbers 10. When the operator rotates the steering wheel quickly from the turning position to the neutral position, the step 104 determines that the multiplied value, "DA×A", becomes negative and smaller than the value zero. The program proceeds to the step 105 B. If the step 105B determines that the damping force of the shock absorber 10 is large, the program proceeds to the step 109. The step 109 sets the reference value, "RDA" to be equal to the value determined by the characteristic curve, "Gs(V)" in FIG. 7. As the absolute value of the actual steering angular velocity, "|DA|", becomes smaller than that of the reference value, "RDA", the program proceeds to the step 113. After the time elapses by the time "Ts", the program proceeds to the step 114. In the step 114, the CPU issues the second output signal. As a result, the actuating circuit 30 operates each of the actuators 11 in order to decrease the damping force of the shock absorbers 10. Hence, the oil flow within the shock absorbers 10 is free from the restriction, and promptly stretch. The vehicle roll is promptly solved as indicated in the solid line of FIG. 2(c), thereby it enables the prompt vehicle driving in the straight line.

While the present invention has been described in its preferred embodiments, it is to be understood that the invention is not limited thereto, and may be otherwise embodied within the scope of the following claims.

What is claimed is:

1. A shock absorber control unit for use in a vehicle having a steering wheel and at least one shock absorber said at least one shock absorber having a damping force which is adjustable, comprising:
    a vehicle speed sensor for detecting a vehicle speed;
    a vehicle speed signal generating means for receiving the vehicle speed detected by the vehicle speed sensor and generating a vehicle speed signal;
    a steering angle sensor for detecting a steering angle of the steering wheel, and for detecting a rotational direction of the steering wheel;
    a steering angular velocity signal generating means for receiving the steering angle and detecting a period between a start and an end of rotation of the steering wheel and calculating and generating a steering angular velocity signal;
    a compensating means for compensating the steering angular velocity signal generated by said steering angular velocity signal generating means in accordance with the vehicle speed signal generated by said vehicle speed signal generating means, said compensating means also generates a compensated steering angular velocity signal;
    a reference value setting means for setting a first reference value when the steering wheel is turned in a direction from its neutral position to a first turning position, and for setting a second reference value to be larger said first reference value when the steering wheel is turned in a direction from the first turning position to the neutral position in accordance with the rotational direction detected by said steering angle sensor;
    a comparing means for comparing the first reference value or the second reference value with the compensated steering angular velocity signal, and for generating a first output signal when the compensated steering angular velocity signal is larger than the first reference value, and for generating a second output signal when the compensated steering angular velocity signal is smaller than the second reference value; and
    an actuating means for increasing a damping force of the shock absorber when the first output signal is generated by said comparing means, or decreasing the damping force of the shock absorber when the second output signal is generated by the comparing means, whereby a roll of the vehicle is prevented by increasing and decreasing the damping force exerted on the shock absorber.

2. The shock absorber control unit of claim 1, wherein the actuating means comprises an actuating circuit for receiving the output signal of the comparing means and generating an actuating signal, and an actuator for receiving the actuating signal of the actuating circuit and controlling the damping force of the shock absorbers.

3. The shock absorber control unit of claim 2, wherein a central processing unit functions as the vehicle speed signal generating means, the steering angular velocity signal generating means, the reference value setting means, the comparing means, and the actuating circuit.

4. The shock absorber control until of claim 1, wherein said compensating means generates a first compensated steering angular velocity when the value of the vehicle speed signal is larger than a predetermined value, and said compensating means generates a second compensated steering angular velocity when the value of the vehicle speed signal is smaller than the predetermined value.

5. A shock absorber control unit for use in a vehicle having a steering wheel and at least one shock absorber, said at least one shock absorber having a damping force which is adjustable, comprising:
    a first detecting means for detecting a vehicle speed;
    a second detecting means for detecting a steering angle defined between a start and an end of a rotation of the steering wheel and for detecting a direction of rotation of the steering wheel;
    a first calculating means for calculating a value of the vehicle speed detected by said first detecting means;
    a steering angle velocity signal generating means for detecting a period between the start and end of rotation of the steering wheel and for calculating a value of a steering angular velocity in accordance with the steering angle detected by said second detecting means;
    a compensating means for compensating the value of the steering angular velocity calculated by said second calculating means in accordance with the value of the vehicle speed calculated by said first calculating means and for generating a compensated steering angular velocity signal;
    a reference value setting means for setting a first reference value when the steering wheel is turned in the direction from its neutral position to a first turned position, setting a second reference value when the steering wheel is turned in the direction from the first turned position to a second further turned position, and setting a third reference value when the steering wheel is turned in the direction from the first turned or second further turned positions to the neutral position in accordance with the rotational direction detected by said second detecting means;

a comparing means for comparing one of the reference values with the compensated steering angular velocity signal, and generating a first output signal when the compensated steering angular velocity signal is larger than the first reference value, generating a second output signal when the compensated steering velocity signal is larger than the second reference value, and generating a third output signal when the compensated steering angular velocity signal is smaller than the third reference value; and an actuating means for increasing a damping force of the shock absorber when the first output signal is generated by said comparing means, further increasing the damping force when the second output signal is generated, and decreasing the damping force when the third output signal is generated.

6. The shock absorber control unit of claim 5, wherein said compensating means generates a first compensated steering angular velocity when the value of the vehicle speed signal is larger than a predetermined value, and said compensating means generates a second compensated steering angular velocity when the value of the vehicle speed signal is smaller than the predetermined value.

7. A shock absorber control unit for use in a vehicle having a steering wheel and at least one shock absorber, said at least one shock absorber having a damping force which is adjustable, comprising;

a first detecting means for detecting a vehicle speed;

a second detecting means for detecting a steering angle defined between a start and an end of a rotation of the steering wheel during a predetermined time period and for detecting a rotational direction of the steering wheel;

a first calculating means for calculating a value of the vehicle speed detected by said first detecting means;

a second calculating means for calculating a value of a steering angular velocity in accordance with the steering angle detected by said second detecting means and the predetermined time period, said predetermined time period being stored in the memory of said second calculating means;

a compensating means for compensating the value of the steering angular velocity calculated by said second calculating means in accordance with the value of the vehicle speed calculated by said first calculating means and for generating a compensated steering angular velocity signal;

a reference value setting means for setting a first reference value when the steering wheel is turned in the direction from its neutral position to a first turned position, setting a second reference value when the steering wheel is turned in the direction from the first turned position to a second further turned position, and setting a third reference value when the steering wheel is turned in the direction from the first turned or second further turned positions to the neutral position in accordance with the rotational direction detected by said second detecting means;

a comparing means for comparing one of said reference values with the compensated steering angular velocity signal, and generating a first output signal when the compensated steering angular velocity signal is larger than the first reference value, generating a second output signal when the compensated steering angular velocity signal is larger than the second reference value, and generating a third output signal when the compensated steering angular velocity signal is smaller than the third reference value; and an actuating means for increasing a damping force of the shock absorber when the first output signal is generated by said comparing means, further increasing the damping force when the second output signal is generated, and decreasing the damping force when the third output signal is generated.

8. The shock absorber control unit of claim 7, wherein said compensating means generates a first compensated steering angular velocity when the value of the vehicle speed signal is larger than a predetermined value, and said compensating means generates a second compensated steering angular velocity when the value of the vehicle speed signal is smaller than the predetermined value.

* * * * *